(12) United States Patent
Samsfort

(10) Patent No.: US 9,765,866 B2
(45) Date of Patent: Sep. 19, 2017

(54) BACKLASH-FREE SPINDLE NUT

(71) Applicant: MAXON MOTOR AG, Sachseln (CH)

(72) Inventor: Peter Samsfort, Endingen (DE)

(73) Assignee: MAXON MOTOR AG, Sachseln (CH)

( * ) Notice: Subject to any disclaimer, the term of this patent is extended or adjusted under 35 U.S.C. 154(b) by 226 days.

(21) Appl. No.: 14/596,723

(22) Filed: Jan. 14, 2015

(65) Prior Publication Data
US 2015/0198223 A1 Jul. 16, 2015

(30) Foreign Application Priority Data

Jan. 14, 2014 (EP) .................................. 14000129

(51) Int. Cl.
*F16H 25/00* (2006.01)
*F16H 25/20* (2006.01)

(52) U.S. Cl.
CPC .... *F16H 25/2006* (2013.01); *Y10T 74/19902* (2015.01)

(58) Field of Classification Search
CPC ........................ F16H 25/2006; F16H 25/2003
IPC .................................................. F16H 25/2006
See application file for complete search history.

(56) References Cited

U.S. PATENT DOCUMENTS

| 525,780 | A | * | 9/1894 | Boynton | ............. | F16H 25/2006 |
| | | | | | | 74/441 |
| 3,851,541 | A | * | 12/1974 | Ploss | .................. | F16H 25/2209 |
| | | | | | | 74/441 |
| 4,353,264 | A | | 10/1982 | Erikson et al. | | |
| RE31,713 | E | * | 10/1984 | Erikson | ............... | F16H 25/2006 |
| | | | | | | 74/441 |
| 4,872,795 | A | | 10/1989 | Davis | | |
| 4,954,032 | A | * | 9/1990 | Morales | .............. | F16H 25/2006 |
| | | | | | | 411/289 |
| 5,501,118 | A | * | 3/1996 | Benton | ............... | F16H 25/2209 |
| | | | | | | 470/2 |
| 5,732,596 | A | | 3/1998 | Erikson et al. | | |
| 5,839,321 | A | | 11/1998 | Siemons | | |

(Continued)

FOREIGN PATENT DOCUMENTS

| DE | 2546109 A1 | 4/1977 |
| DE | 3929505 A1 | 3/1990 |

(Continued)

OTHER PUBLICATIONS

European Search Report mailed on Jul. 2, 2014, for European Application No. 14000129.8.

*Primary Examiner* — David M Fenstermacher
(74) *Attorney, Agent, or Firm* — Buchanan Ingersoll & Rooney PC

(57) ABSTRACT

A backlash-free spindle nut is disclosed with a thread that can be meshed with a spindle. The spindle nut has a first nut part with a first internal thread and a second nut part with a second internal thread that can be twisted in relation to the first nut part. To generate a preload between the first nut part and the second nut part, the spindle nut has an elastic element. The preload can be adjusted through relative twisting between the first nut part and the second nut part. The elastic element can work between the first nut part and a secure intermediate part, whereby relative twisting between the first nut part and the second nut part can be locked by locking a relative twisting position between the second nut part and the intermediate part.

18 Claims, 6 Drawing Sheets

(56) References Cited

U.S. PATENT DOCUMENTS

Figure 1:
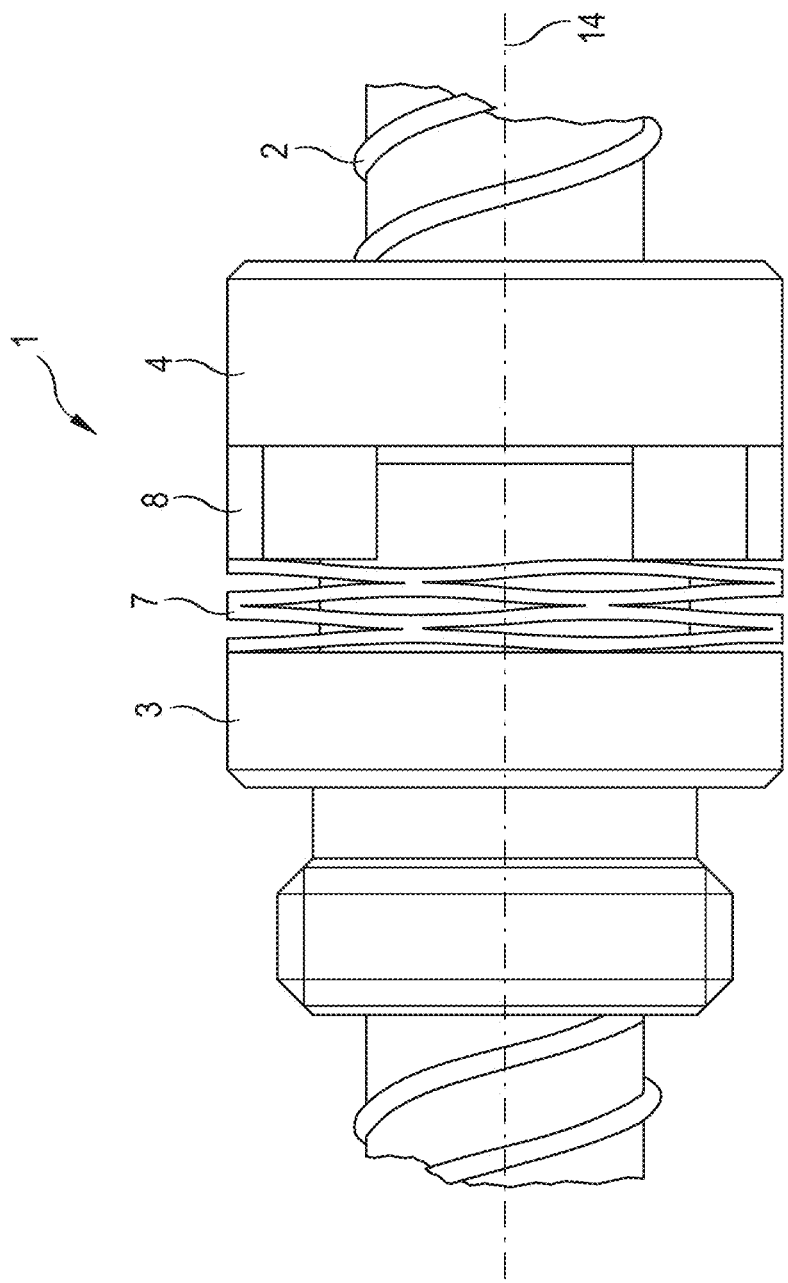

| | | | |
|---|---|---|---|
| 6,041,671 A | 3/2000 | Elrkson et al. | |
| 6,119,541 A * | 9/2000 | Robinson | F16H 25/2006 74/441 |
| 6,131,478 A | 10/2000 | Erikson et al. | |
| 7,841,251 B2 * | 11/2010 | Bogue | F16B 37/00 74/89.42 |
| 2001/0023618 A1 * | 9/2001 | Huppmann | F16H 25/2209 74/89.42 |
| 2004/0250637 A1 * | 12/2004 | Hosokai | F16H 25/2006 74/89.42 |
| 2006/0207360 A1 * | 9/2006 | Lindemann | F16H 61/28 74/89.42 |
| 2007/0068292 A1 * | 3/2007 | Liu | F16H 25/2209 74/89.42 |
| 2007/0227280 A1 * | 10/2007 | Chen | F16H 25/2209 74/89.42 |
| 2007/0295128 A1 * | 12/2007 | Erikson | D04B 21/04 74/89.42 |
| 2009/0145252 A1 * | 6/2009 | Schroeder | F16H 25/2006 74/89.42 |
| 2012/0192662 A1 | 8/2012 | Kluge | |

FOREIGN PATENT DOCUMENTS

| | | |
|---|---|---|
| DE | 4010111 A1 | 5/1991 |
| DE | 4204304 A1 | 9/1993 |
| DE | 69509125 T2 | 8/1999 |
| DE | 69903426 T2 | 6/2003 |
| DE | 69723674 T2 | 4/2004 |
| EP | 0060270 B1 | 12/1986 |
| WO | WO 99/63248 A1 | 12/1999 |

* cited by examiner

BACKLASH-FREE SPINDLE NUT

The present invention concerns a backlash-free spindle nut.

A backlash-free spindle nut of the generic kind has a thread that can be meshed with a spindle. Moreover, the spindle nut has a first nut part with a first internal thread and a second nut part with a second internal thread that can be twisted in relation to the first nut part. Together, the first internal thread and the second internal thread form the thread of the spindle nut. To generate a preload between the first nut part and the second nut part, an elastic element such as a spring is further provided for. In a spindle nut of the generic kind, the preload is adjustable through relative twisting between the first nut part and the second nut part.

Backlash-free spindle nuts are known from the state of the art. For example, DE 4 204 304 A1 shows a one-piece spindle nut whose central area is itself formed as a spring and designed with several slits for this purpose. One of the two threaded inserts is thereby firmly connected with the respective end part, the other threaded insert is screwed into the spindle nut and can therefore be adjusted to set the preload in a stepless manner. Manufacturing of the spindle nut known from DE 4 204 304 A1 is extremely complex.

A two-part spindle nut is known from DE 695 09 125 T2, in which the preload is generated by means of a torsion spring that causes relative twisting of the two nut parts. Hence, the preload does not work in the axial direction but in the circumferential direction. The preload cannot be set for the spindle nut known from DE 695 09 125 T2. Due to the use of a torsion spring, the nut builds relatively long.

A two-part spindle nut, which also works with a torsion spring, is shown in EP 0 060 270 B1. Although the load of the torsion spring can be adjusted for this spindle nut, this spindle nut also has the problem of using a relatively large installation space in the axial direction.

For the spindle nut known from DE 697 23 674 T2, the preload is also generated by means of a torsion spring. The spindle nut comprises two nut parts that are secured against relative twisting. Between the two nut parts, there is a guiding that ensures relocatable positioning of the second nut part in relation to the first nut part in the axial direction. In a central area of the spindle nut, the two nut parts are enclosed by a hollow cylindrical sleeve that is equipped on one of its two ends with ramp-shaped notches arranged in a circumferential direction that interact with equally ramp-shaped notches of the first nut part. The arrangement ensures that the two nut parts will be pressed apart in an axial direction if the cylindrical sleeve is twisted in relation to the first nut part. The respective torsion spring ensures the generation of a preload acting in a circumferential direction between the sleeve and the first nut part. Due to the relatively complex structure, the spindle nut known from DE 69 723 674 T2 also uses a relatively large installation space in the axial direction. Moreover, the preload for this spindle nut cannot be adjusted.

A two-part spindle nut with a relatively simple structure is shown in DE 4 010 111 A1. In this spindle nut, the two nut parts are also positioned relocatably in relation to each other and in the axial direction. Relative twisting of the second nut part in relation to the first nut part is ruled out. To generate the preload, there is a simple screw spring that ensures that the two nut parts will be pressed apart in the axial direction. Adjustment of the preload generated in this process is not possible.

DE 3 929 505 A1 describes a two-part spindle nut for which no preload is generated. However, the spindle nut can be adjusted afterwards in order to eliminate backlash due to wear.

Eventually, a backlash-free spindle nut of the type from the respective product category is known from DE 69 903 426 T2. The spindle nut essentially consists of two nut parts that can be twisted against each other. Preload is ensured by an elastomer ring that is arranged between the two nut parts and that is compressed progressively as the two nut parts are twisted against each other. A gearing is provided to lock the relative twisting position of the two nut parts. One of the two nut parts therefore has an external gearing and the other nut part is equipped with two elastic flaps that are positioned opposite to each other from the perspective of the circumferential direction and that also have a gearing, which meshes with the external notches of the first nut part. At the same time, the gearing forms an axial guiding mechanism between the first and the second nut part. The external gearing of the first nut part and the elastic flaps of the second nut part interact in the manner of a ratchet. This means that relative twisting of the two nut parts will be possible if a certain force is applied. The elastic flaps of the second nut part are thereby shortly pressed towards the outside and subsequently snap back, transposed by one bolt, into the external gearing of the first nut part. The spindle nut known from DE 699 03 426 T2 builds relatively large in a radial direction, as the nut part notched on the outside practically needs to be enclosed by the second nut part. Moreover, in order to be able to ensure a reasonable scope of adjustment, the elastic flaps are relatively long, which in turn leads to an undesired large building length.

Consequently, the purpose of the present invention is the further development of a backlash-free spindle nut of the initially mentioned type so that a structure with a maximum level of compactness can be reached and that the preload can be adjusted. In addition, the spindle nut should have a simple structure and be manufactured cost-efficiently.

The purpose is solved by the features of the independent claim 1. According to that, a solution according to the invention is given with a backlash-free spindle nut of the generic kind if the spindle nut has an intermediate part that is secured against twisting in relation to the first nut part whereby the elastic element works between the first nut part and the intermediate part and whereby relative twisting between the first nut part and the second nut part can be locked by means of locking a relative twisting position between the second nut part and the intermediate part.

The solution according to the invention offers the advantage of the spindle nut having a flexible structure while being extremely compact. Through the provision of an intermediate part, a gearing can for example be provided for locking of the relative twisting position of the two nut parts at a particularly well-suited place. Contrary to, for instance, the spindle nut known from DE 69 903 426 T2, this device does not necessarily require equipment of one of the two nut parts with an external gearing and design of the other nut part in a way as to radially enclose the first nut part. Also, it is not required for the solution according to the invention that the gearing has to ensure at the same time an axial guiding system between the two nut parts and that it has a relatively broad design for this purpose.

The preload generated by the elastic element preferably works in an axial direction. Thereby it is possible to either press the two nut parts together or apart. Especially the latter is preferred.

In a preferred embodiment of the present invention, the intermediate part is equipped with first form-locking elements that can be meshed with second form-locking elements of the second nut part whereby the relative twisting position between the second nut part and the intermediate part can be locked through the engagement between the first and second form-locking elements. This is how an easy-to-implement lockability can be achieved. The form-locking elements can, for example, be arranged in an evenly distributed manner in the circumferential direction in order to lock the second nut part in several possible twisting positions in relation to the first nut part. Preferably, all form-locking elements are identical to ensure smooth meshing in the different possible twisting positions.

In another especially preferred embodiment of the present invention, the first form-locking elements are formed on an axial stop of the intermediate part, and the second form-locking elements on an opposite axial stop of the second nut part. This is how a particularly compact structure, especially in a radial direction, is achieved. The respective form-locking elements are preferably designed on an outside abutting face of the intermediate part and the second nut part respectively.

Further preferably, the first and second form-locking elements are each formed by the teeth of a toothing of the intermediate part and the second nut part. A toothing provides a particularly simple locking possibility. If the toothing is designed as an abutting face gearing system, a particularly compact structure can be achieved.

A particularly simple and cost-efficient manufacturing process can be ensured if the first and second form-locking elements are each formed by a knurling of the intermediate part and/or the second nut part. Also here, it is advantageous to design the knurling respectively on an axial stop of the component in question.

In another preferred embodiment of the present invention, the intermediate part is guided by means of a guiding in an axially relocatable way opposite to the first nut part. This ensures in a simple way the relocatability of the intermediate part in an axial direction in relation to the first nut part whereas an anti-twist lock is maintained between the first nut part and the intermediate part. A particularly simple and cost-efficient structure can be ensured if the guiding is realized through a recess of the first nut part in which the intermediate part is positioned in an axially relocatable way.

In another particularly preferred embodiment, said recess for guiding the intermediate part is formed in a protrusion of the first nut part. This is also conducive to a particularly simple and above all compact structure, especially in cases where the elastic element encloses the protrusion radially. The protrusion preferably has a cylindrical shape and a smaller diameter than the part of the first nut part on which the protrusion is formed. Alternatively, it is possible not to create the hollow cylindrical protrusion with a smaller diameter. In this case, it will be advantageous with regard to a compact structure if the elastic element is at least partially enclosed by the hollow cylindrical protrusion. For example, a hollow cylindrical spring could be installed within the hollow cylindrical protrusion.

Another advantage arises if the second nut part has a recess for receiving the protrusion. Through interaction between the protrusion and the recess, it can be ensured that the first nut part and the second nut part always stand concentrically to each other. In addition, this can enable the creation of an axial guiding between the two components.

The recess formed in the protrusion for guiding the intermediate part is preferably designed in a symmetric manner in relation to the axis of the spindle nut. It preferably breaks through the protrusion in a radial direction so that the intermediate part can stick out of the protrusion in a radial direction.

In another particularly preferred embodiment of the present invention, the elastic element is a spring washer. Due to this embodiment, the compact structure of the spindle nut, especially in an axial direction, can be further optimized. Although it is also possible to use, for instance, a spiral spring instead of a spring washer, spiral springs require a significantly greater overall length. In order to ensure a particularly large adjustment range, it is further advantageous if the spring washer is designed as a multi-waved spring washer.

In another preferred embodiment, the intermediate part is substantially shaped as a plate whereby the plate-shaped intermediate part is aligned perpendicularly to the axis of the spindle nut. Also, this can further optimize the compact structure of the spindle nut according to the invention. The invention is particularly well suited for small spindle nuts with a length of <20 mm and a radial width of <15 mm. The parts of the spindle nut can be made of different materials. Especially metal is suitable for manufacturing of the first and second nut part as well as of the intermediate part. Ceramic materials, especially zirconium oxide, are also appropriate. Apart from this, also a spindle that interacts with the spindle nut according to the invention can be made of a ceramic material, especially of zirconium oxide.

As becomes clear from the preferred embodiments explained above, the invention offers in particular the advantage that the spindle nut according to the invention can be assembled with just a few simply structured parts. The spindle nut preferably consists of four separate components, notably the first and the second nut part, the intermediate part and the plate spring and/or spring washer. However, it is also possible, for example, to connect the spring with the first nut part. Depending on which material is chosen for the individual components, it would be possible, for example, to solder, to glue or to otherwise connect the spring with the first nut part. Also between the spring and the intermediate part, such a connection is conceivable in principle.

Figure 2:
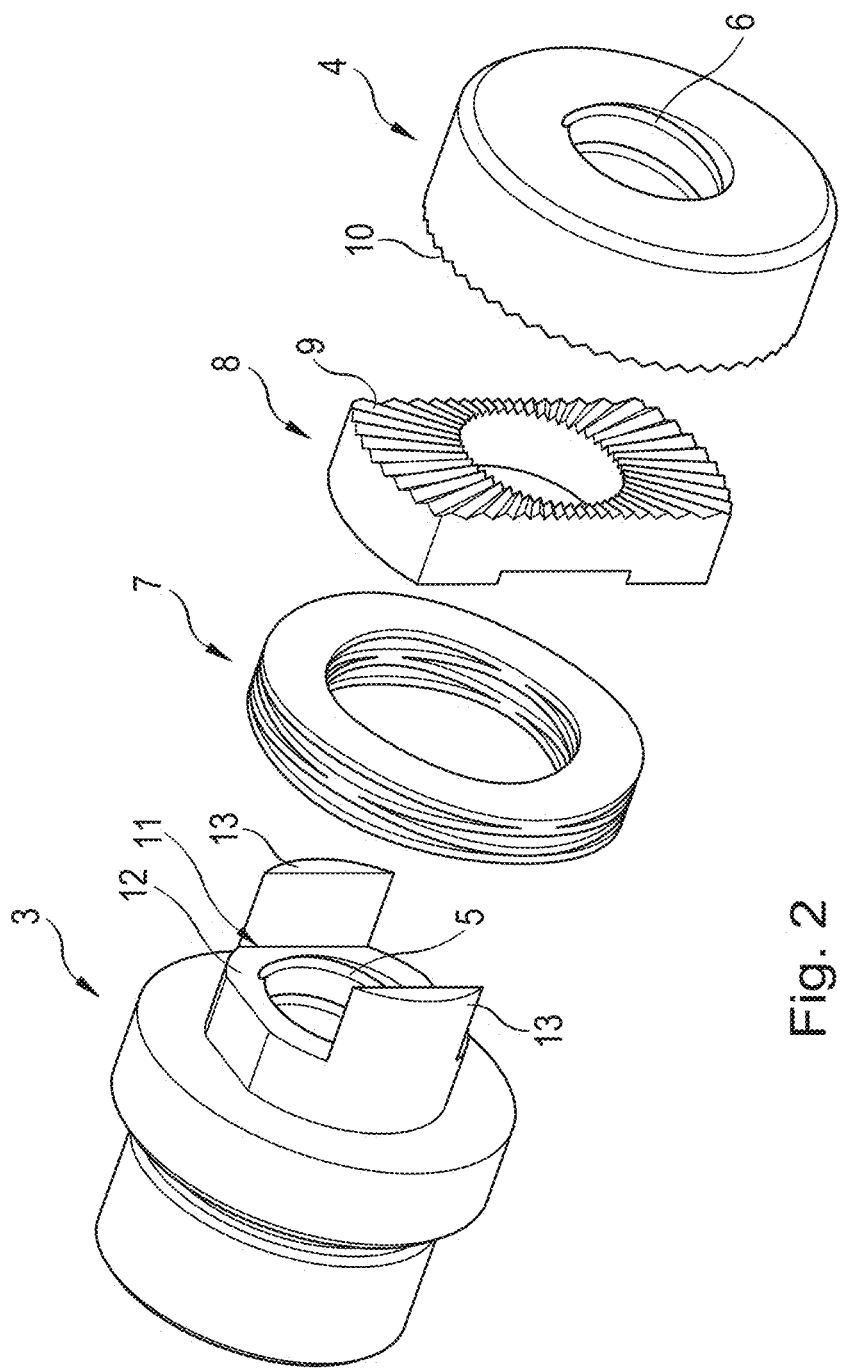
Figure 3:
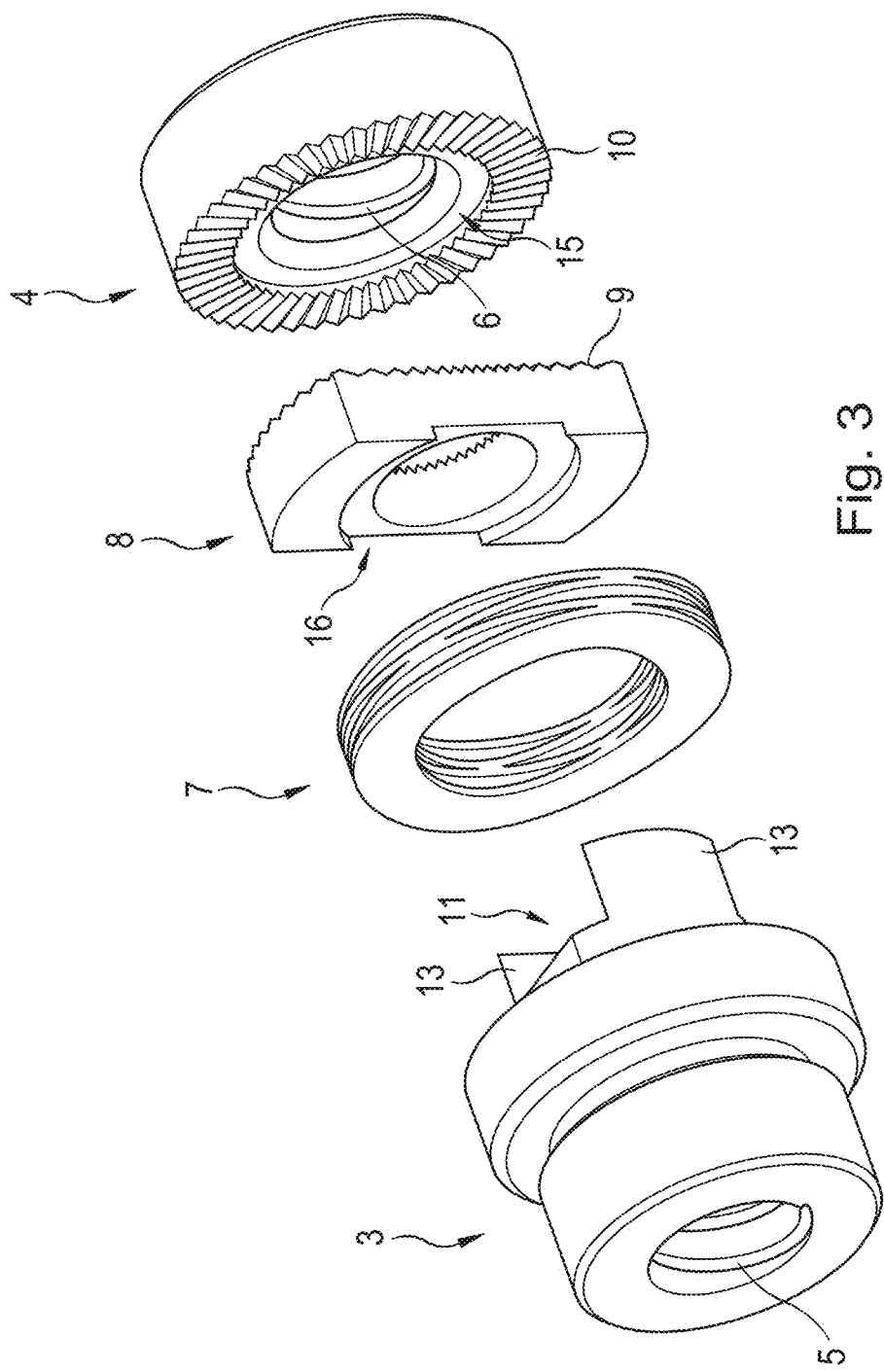
Figure 4:
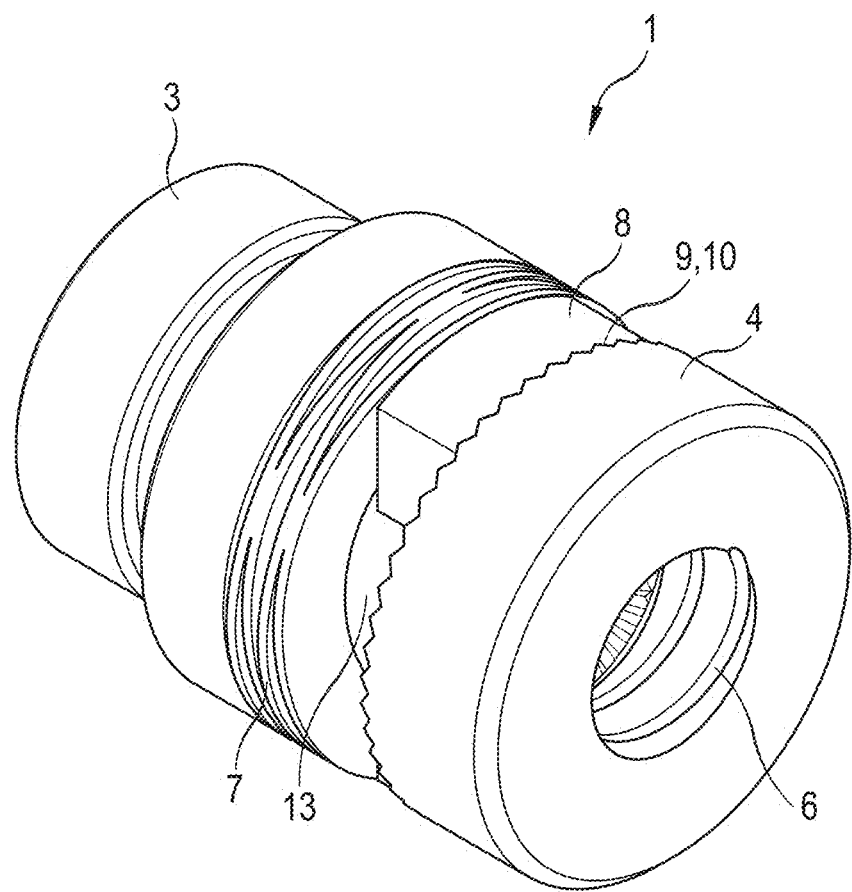
Figure 5:
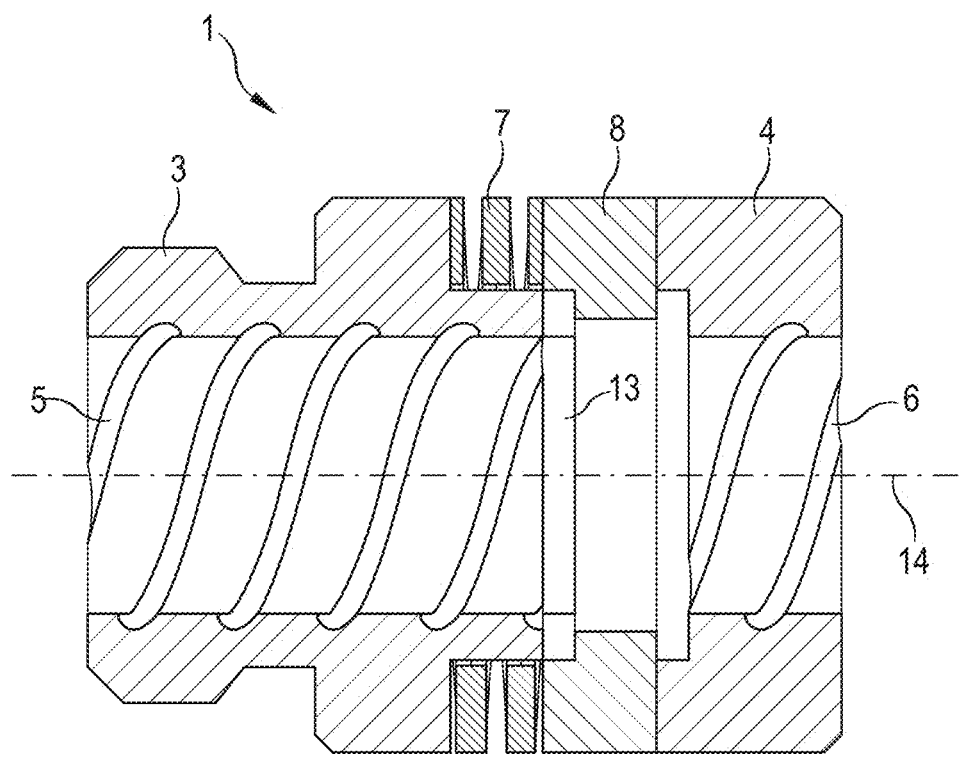

In the following, an embodiment of the present invention is explained in greater detail with reference to drawings. They show:

FIG. 1 an example of the spindle nut, according to the invention, on a spindle from a lateral perspective, FIG. 2 an exploded view drawing of the spindle nut according to the invention from FIG. 1 (oblique view), FIG. 3 the exploded view drawing from FIG. 2 from the other side, FIG. 4 a perspective view of the spindle nut, according to the invention, from FIG. 1, FIG. 5 a longitudinal section of the spindle nut, according to the invention, from FIGS. 1 to 4, and FIG. 6 a longitudinal section of the spindle nut, according to the invention, from FIGS. 1 to 5 in case of a stronger preload.

In the following explanations, identical parts are designated by identical references. If the drawing contains references that are not further explained in the pertaining figure description, reference is made to the previous or subsequent figure descriptions.

FIG. 1 shows an example of a spindle nut 1, according to the invention, which is screwed on a spindle 2. The spindle nut comprises a first nut part 3 as well as a second nut part 4, each with a base unit that is essentially developed in a rotationally symmetric manner in relation to the axis 14 of the spindle nut. Between the first nut part 3 and the second nut part 4, there is an intermediate part 8, which is pressed onto the second nut part 4 by a multi-waved spring washer 7, which is on one hand aligned to the first nut part 3 and to the intermediate part 8 on the other hand.

The structure of the spindle nut according to the invention is shown in greater detail by the exploded view drawings of FIGS. 2 and 3. The first nut part 3 comprises an essentially hollow cylindrical protrusion 12, whose external diameter is smaller than the external diameter of the first nut part itself. The multi-waved spring washer 7 is pinned upon the protrusion 12 so that it encloses the protrusion radially in the assembled state. The outer end of the protrusion 12 has a recess 11 in which the plate-shaped intermediate part 8 is inserted. Due to the recess, only two lateral guiding flaps 13, that are arranged opposite to each other and on which the plate-shaped intermediate part 8 is positioned in an axially relocatable way, will remain at the outer end of the protrusion. Due to this, the intermediate part 8 is at the same time secured against twisting in relation to the first nut part 3. FIG. 3 shows that the intermediate part 8 also has a recess 16 on the side that faces the first nut part 3, which is penetrated by the lower part of the protrusion 12 when the first nut part and the intermediate part are pressed together against a spring force generated by the multi-waved spring washer 7.

On the opposite side that faces the second nut part 4, the intermediate part has an abutting face gearing 9, which interacts with an opposite abutting face gearing 10 of the second nut part 4 as shown, for example, in FIG. 4. FIG. 3 also shows that the second nut part 4 also has a recess 15 which can be penetrated by the front end of the protrusion 12 with the two lateral guiding system sections 13.

Figure 6:
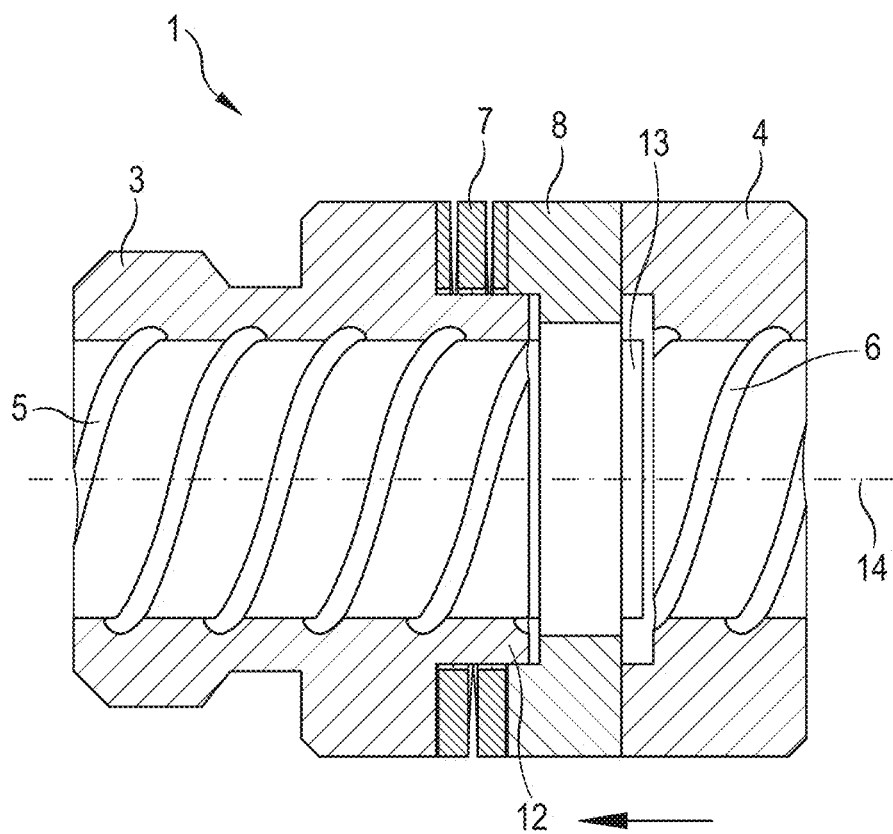

All components have a central through-hole whereby the first nut part 3 is equipped with a first internal thread 5 and the second nut part 4 with a second internal thread 6. In an assembled state, the internal thread 4 is practically the continuation of the internal thread 5. Hence, the two internal threads together form the thread of the spindle nut according to the invention. This is shown, for example, by means of the longitudinal section in FIG. 5. In this figure, the spindle nut according to the invention is displayed with a relatively low preload. The preload usually remains constant as the relative twisting position of the second nut part 4 is attached in relation to the first nut part 3 through the recess of the two at the intermediate part and/or the gearings 9 and 10 developed on the second nut part 4. Through application of a certain force, the second nut part can be twisted in relation to the first nut part though. This means that the two nut parts can be screwed apart or together alongside the spindle, which is not displayed in FIGS. 5 and 6 for reasons of clarity. The gearings 9 and 10 of the intermediate part and the second nut part are thereby disengaged for a short time and snap back transposed by one and/or several bolts shortly after. FIG. 6 shows the spindle nut according to the invention during increased preload. This means that the two nut parts 3 and 4 are screwed together more closely compared to the state shown in FIG. 5 so that the spring 7 is compressed somewhat more strongly and hence generates a greater preload. It can be clearly seen that the protrusion 12 slightly penetrates the recess 16 of the intermediate part 8 in the process. To the same extent, the two lateral guiding system flaps 13 penetrate the recess 15 of the second nut part 4.

The first nut part 3, the second nut part 4 as well as the intermediate part 8 are preferably made of metal but can also be made of a ceramic material such as zirconium oxide. The multi-waved spring washer 7 is preferably made of steel.

The invention claimed is:

1. A backlash-free spindle nut with a thread which can be meshed with a spindle, the spindle nut comprising:
    a first nut part with a first internal thread; and
    a second nut part, separate from the first nut part and twistable in relation to the first nut part, with a second internal thread, whereby the first internal thread and the second internal thread together form the thread of the spindle nut;
    an elastic element to generate a preload between the first nut part and the second nut part, the preload being adjustable through relative twisting between the first nut part and the second nut part; and
    an intermediate part that is separate from the first part and second nut part and is secured against twisting in relation to the first nut part, whereby the elastic element is positioned to work between the first nut part and the intermediate part, and whereby relative twisting between the first nut part and the second nut part can be locked by locking a relative twisting position between the second nut part and the intermediate part.

2. The spindle nut according to claim 1, wherein the intermediate part comprises:
    first form-locking elements for meshing with second form-locking elements of the second nut part, whereby a relative twisting position between the second nut part and the intermediate part can be locked through engagement between the first and second form-locking elements.

3. The spindle nut according to claim 1, wherein the first form-locking elements are formed on an axial stop of the intermediate part and the second form-locking elements are formed on an opposite axial stop of the second nut part.

4. The spindle nut according to claim 1, wherein first and second form-locking elements are each formed by teeth of a toothing of the intermediate part and of the second nut part.

5. The spindle nut according to claim 1, wherein first and second form-locking elements are each knurled portions of the intermediate part and of the second nut part.

6. The spindle nut according to claim 1, comprising:
    a recess of the first nut part, the intermediate part being arranged to be guidable in an axially relocatable way opposite to the first nut part, whereby the guiding is realized by the recess of the first nut part in which the intermediate part is positioned relocatably.

7. The spindle nut according to claim 6, wherein the recess is formed in a protrusion of the first nut part, and the elastic element encloses the protrusion.

8. Spindle nut according to claim 1, wherein the elastic element is a spring washer.

9. The spindle nut according to claim 8, wherein the spring washer has a multi-wave configuration.

10. The spindle nut according to claim 1, wherein the intermediate part has a plate-shape configuration and is aligned perpendicularly to an axis of the spindle nut.

11. The spindle nut according to claim 2, wherein the first and second form-locking elements are each formed by teeth of a toothing of the intermediate part and of the second nut part.

12. The spindle nut according to claim 3, wherein the first and second form-locking elements are each formed by teeth of a toothing of the intermediate part and of the second nut part.

13. The spindle nut according to claim 12, wherein the first and second form-locking elements are each knurled portions of the intermediate part and of the second nut part.

14. The spindle nut according to claim 13, comprising:

a recess of the first nut part, the intermediate part being arranged to be guidable in an axially relocatable way opposite to the first nut part, whereby the guiding is realized by the recess of the first nut part in which the intermediate part is positioned relocatably.

15. The spindle nut according to claim 14, wherein the recess is formed in a protrusion of the first nut part, and the elastic element encloses the protrusion.

16. Spindle nut according to claim 14, wherein the elastic element is a spring washer.

17. The spindle nut according to claim 16, wherein the spring washer has a multi-wave configuration.

18. The spindle nut according to claim 16, wherein the intermediate part has a plate-shape configuration and is aligned perpendicularly to an axis of the spindle nut.

* * * * *